US012187087B2

(12) United States Patent
Lin et al.

(10) Patent No.: US 12,187,087 B2
(45) Date of Patent: Jan. 7, 2025

(54) VEHICLE DRIVETRAIN DEVICE

(71) Applicant: AEON MOTOR CO., LTD., Tainan (TW)

(72) Inventors: Chin Chi Lin, Tainan (TW); Hui-Hui Huang, Tainan (TW); Ming-Ze Weng, Tainan (TW)

(73) Assignee: AEON MOTOR CO., LTD., Tainan (TW)

( * ) Notice: Subject to any disclaimer, the term of this patent is extended or adjusted under 35 U.S.C. 154(b) by 0 days.

(21) Appl. No.: 18/201,175

(22) Filed: May 23, 2023

(65) Prior Publication Data
US 2024/0391284 A1 Nov. 28, 2024

(51) Int. Cl.
*B60G 15/06* (2006.01)
(52) U.S. Cl.
CPC .................. *B60G 15/063* (2013.01)
(58) Field of Classification Search
CPC ............ B60G 15/063; B60G 2200/422; B60G 2204/19; B60K 17/00; B60K 17/32; B60K 17/43; B60K 2007/0053
See application file for complete search history.

(56) References Cited

U.S. PATENT DOCUMENTS

| | | | | |
|---|---|---|---|---|
| 3,860,082 A * | 1/1975 | Testore | ................... | B60K 17/36 180/24.11 |
| 9,630,676 B2 * | 4/2017 | Yelvington | ............ | B62K 11/02 |
| 11,420,514 B2 * | 8/2022 | Ellis | ..................... | B60K 7/0007 |
| 2006/0261570 A1 * | 11/2006 | Eshelman | ................ | B60G 3/20 280/124.137 |
| 2010/0147615 A1 * | 6/2010 | Tsujii | ....................... | B62K 5/01 180/215 |
| 2012/0193161 A1 * | 8/2012 | Chang | ..................... | B62K 5/06 180/215 |
| 2014/0131969 A1 * | 5/2014 | Rowe | .................. | B60G 21/055 280/124.106 |
| 2014/0367951 A1 * | 12/2014 | Barr | ...................... | B62D 21/00 280/781 |
| 2015/0343870 A1 * | 12/2015 | Figueroa | ................ | B60G 7/001 280/124.116 |
| 2018/0170135 A1 * | 6/2018 | Hisada | ................... | B60G 3/202 |
| 2019/0375453 A1 * | 12/2019 | Buchwitz | .............. | B62D 7/166 |

(Continued)

*Primary Examiner* — Paul N Dickson
*Assistant Examiner* — Shams Dhanani
(74) *Attorney, Agent, or Firm* — Hershkovitz & Associates, PLLC; Abe Hershkovitz

(57) ABSTRACT

A vehicle drivetrain device, configured to be mounted between a vehicle frame and a wheel axle of a vehicle, comprises a driving assembly and a shock absorber, connected to the vehicle frame and the driving assembly. The driving assembly comprises a transmitting mechanism, pivotally connected to the vehicle frame and connected to the wheel axle, and a driving mechanism mounted at a side of the transmitting mechanism and outputting power to the wheel axle through the transmitting mechanism. The driving assembly of the vehicle drivetrain device possesses functions of a rear rocker arm and provides power. Therefore, a space between the vehicle frame and the wheel axle can be used efficiently, and the occupancy of a usable space below the vehicle frame is decreased. Furthermore, the transmitting mechanism can be directly connected to the wheel axle by a gear set, simplifying a total structure, thereby lowering the cost.

3 Claims, 8 Drawing Sheets

(56) References Cited

U.S. PATENT DOCUMENTS

2020/0361267 A1\* 11/2020 Ricketts ............... B60G 15/063
2020/0361268 A1\* 11/2020 Kuribayashi ........ B60G 15/063
2021/0162873 A1\* 6/2021 Yu ......................... B60K 17/04

\* cited by examiner

VEHICLE DRIVETRAIN DEVICE

BACKGROUND OF THE INVENTION

1. Field of the Invention

The present invention relates to a vehicle drivetrain device, especially to a drivetrain mounted between a vehicle frame and a wheel axle of a vehicle, and configured to output power to the vehicle.

2. Description of Related Art

A vehicle is mainly powered by a power system of a drivetrain. By a transmitting mechanism and a wheel axle of the drivetrain transferring power from the power system to wheels of the vehicle for rotating the wheels, the vehicle can move on a road. The drivetrain of a vehicle nowadays is mounted on a vehicle frame of the vehicle. A rear rocker arm is pivotally connected to the vehicle frame and is connected to the wheel axle. A shock absorber is connected between the rear rocker arm and the vehicle frame. The drivetrain is connected to the wheel axle on the rear rocker arm by a universal transmitting mechanism to drive the vehicle to move.

However, the drivetrain of a vehicle nowadays is mounted on the vehicle frame, so connecting the drivetrain to the wheel axle by a mechanism such as a hanger or the rear rocker arm is needed, raising the total cost, and thus needing to be improved.

SUMMARY OF THE INVENTION

The objective of the invention is to provide a vehicle drivetrain device to resolve the drawback that a drivetrain nowadays needs to be connected to a wheel axle by a mechanism such as a hanger or a rear rocker arm, raising the total cost.

The vehicle drivetrain device is configured to be mounted between a vehicle frame and a wheel axle of a vehicle, and comprises a driving assembly and a shock absorber. The driving assembly comprises a transmitting mechanism and a driving mechanism. The transmitting mechanism has a pivotal end, pivotally connected to the vehicle frame, and a connecting end, connected to the wheel axle. The driving mechanism is mounted at a side of the transmitting mechanism, and is configured to output power to the transmitting mechanism, which transfers the power outputted by the driving mechanism to the wheel axle. The shock absorber is mounted between the vehicle frame and the driving assembly, and is configured to provide shock absorbing and buffering functions between the vehicle frame and the driving assembly.

The driving assembly of the vehicle drivetrain device is pivotally connected to the vehicle frame and is connected to the wheel axle, and cooperates with the shock absorber to provide the functions of shock absorbing and buffering, and thus the driving assembly possesses functions of a conventional rear rocker arm and provides power. Therefore, a space between the vehicle frame and the wheel axle can be used efficiently, and the occupancy of a usable space below the vehicle frame is decreased. Furthermore, the transmitting mechanism can be directly connected to the wheel axle by a gear set, simplifying a total structure, thereby lowering the cost.

DETAILED DESCRIPTION OF THE PREFERRED EMBODIMENT

Figure 1:
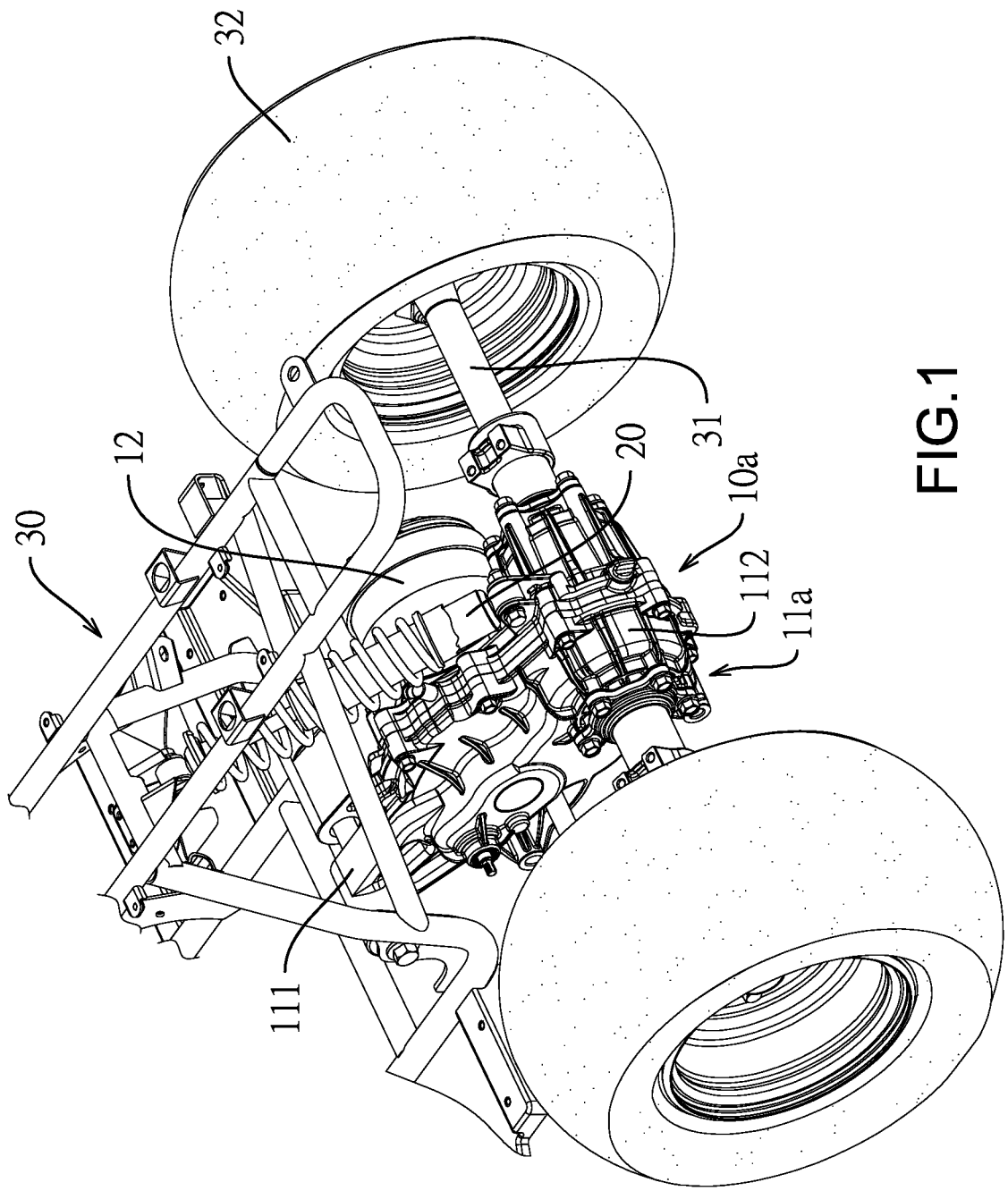
FIG. 1 is a perspective view of a first embodiment of a vehicle drivetrain device in accordance with the present invention.
Figure 2:
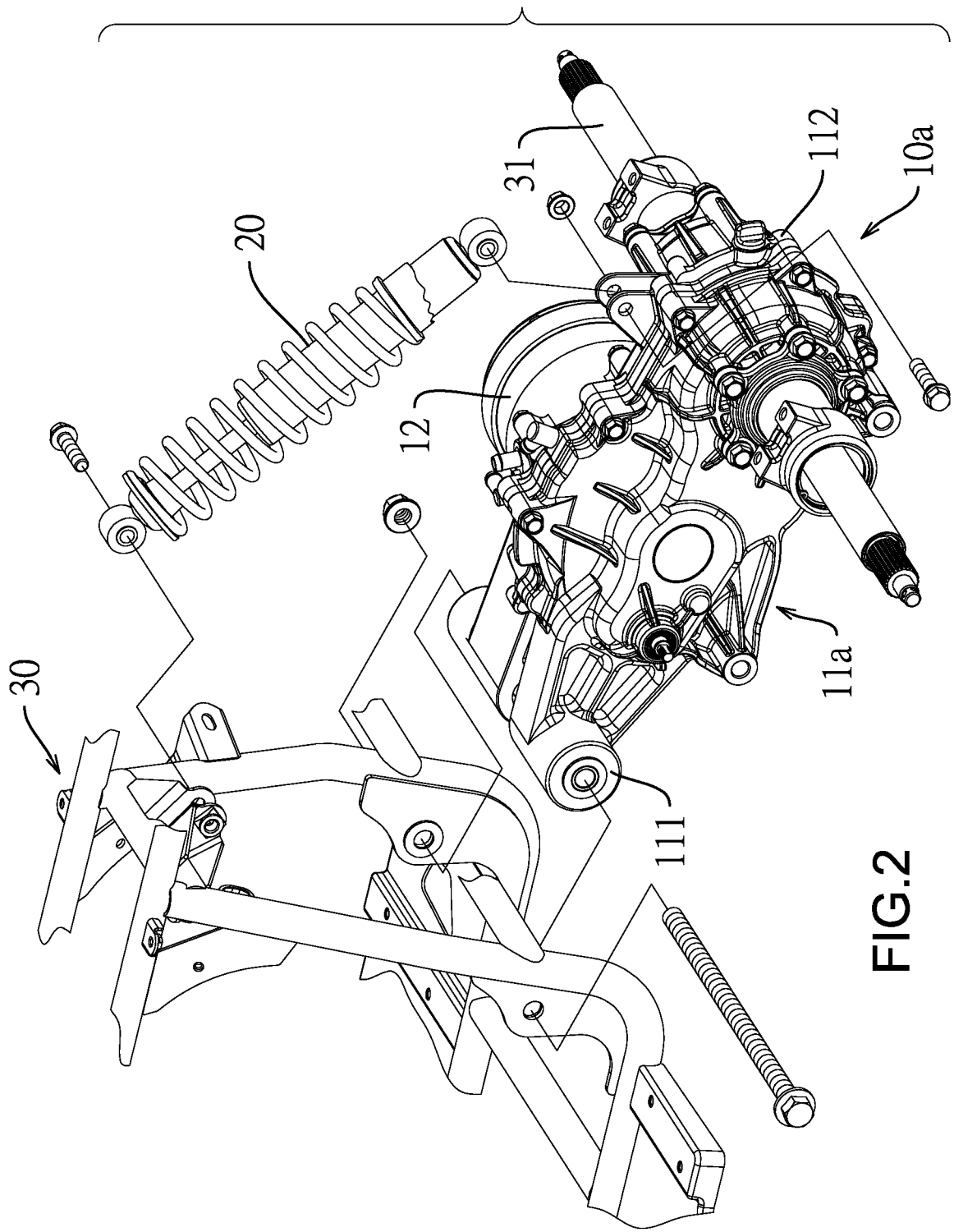
FIG. 2 is an exploded perspective view of the first embodiment of the vehicle drivetrain device in accordance with the present invention.
Figure 3:
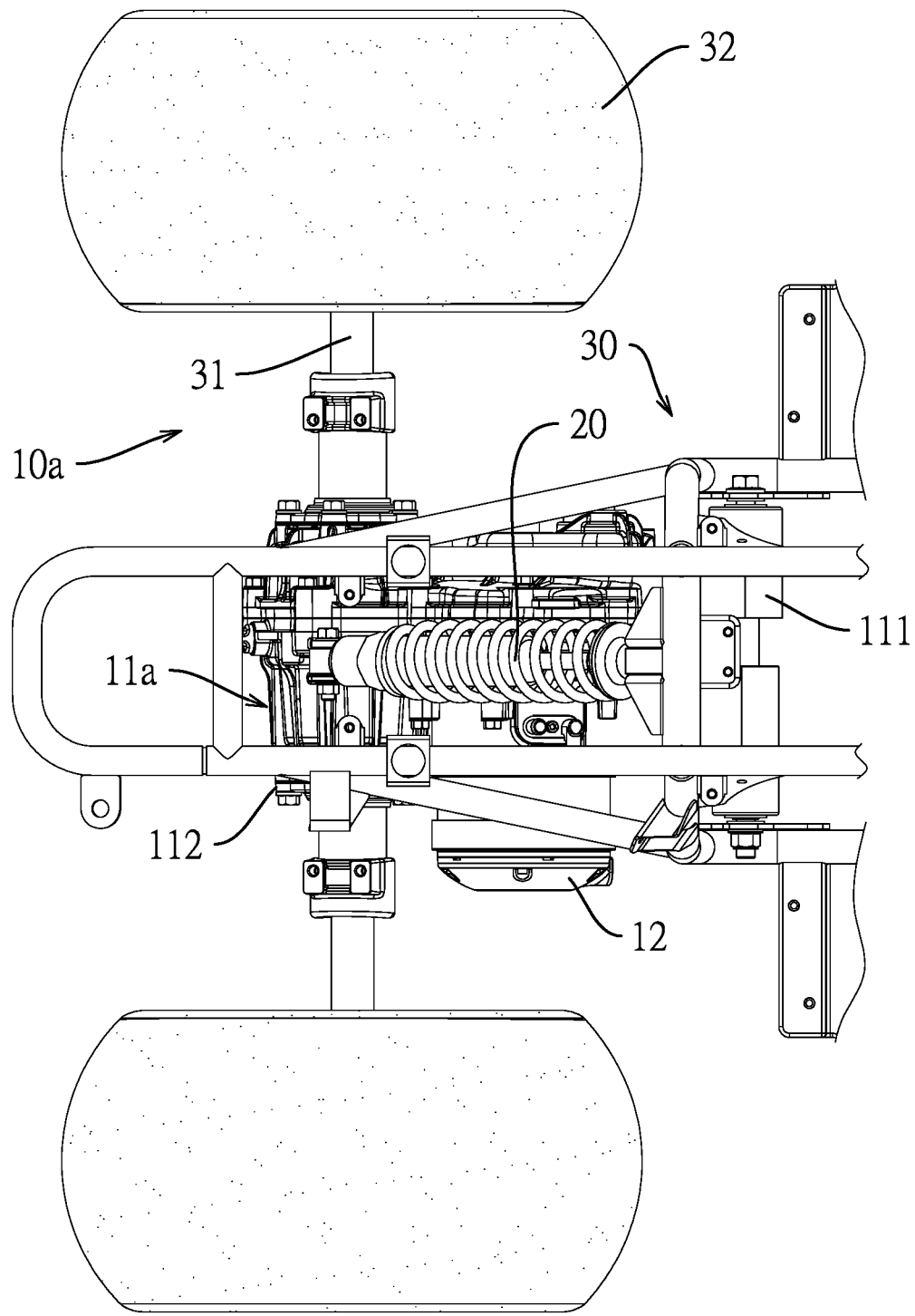
FIG. 3 is an upper view of the first embodiment of the vehicle drivetrain device in accordance with the present invention.
Figure 4:
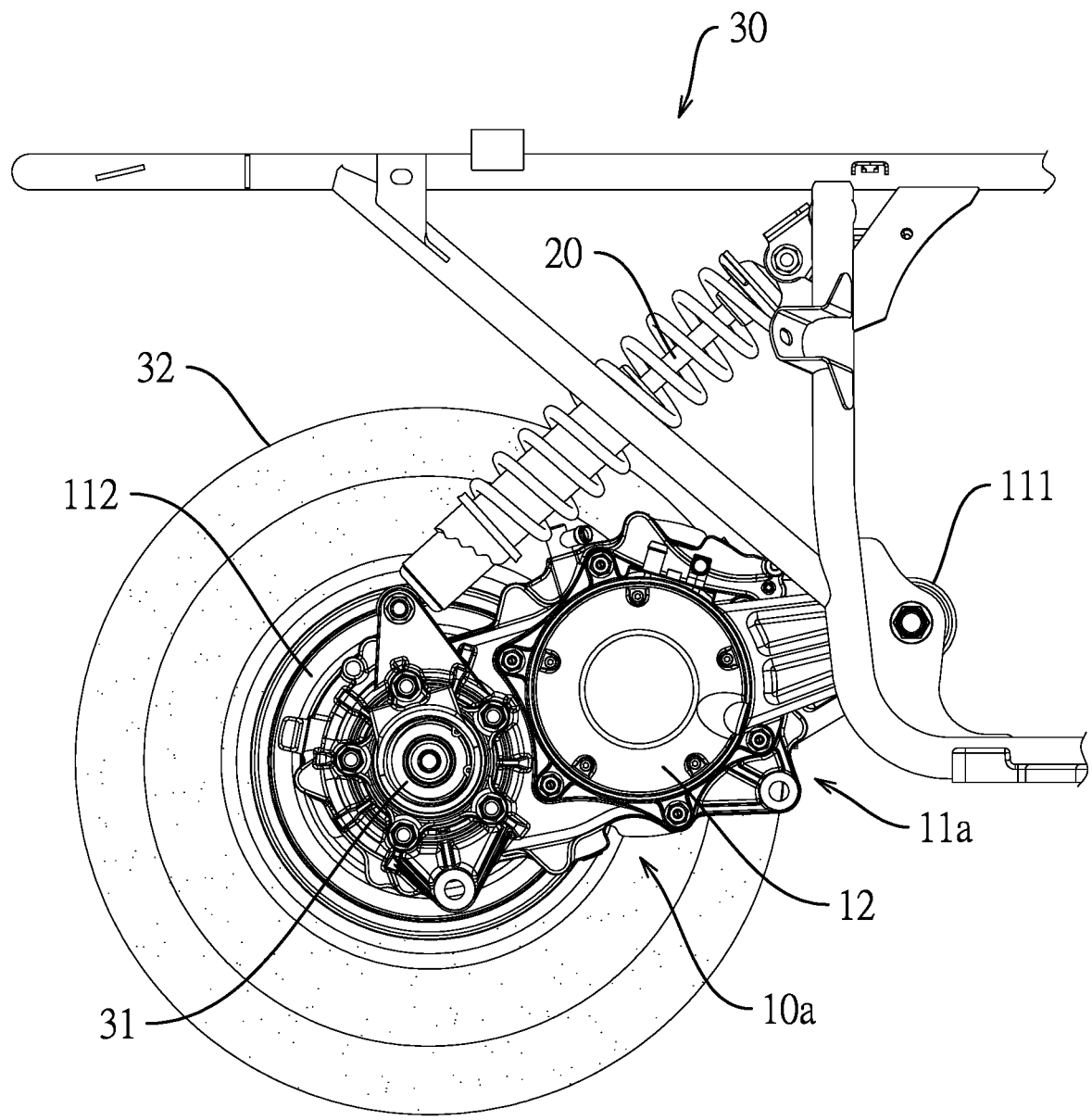
FIG. 4 is a side view of the first embodiment of the vehicle drivetrain device in accordance with the present invention.
Figure 5:
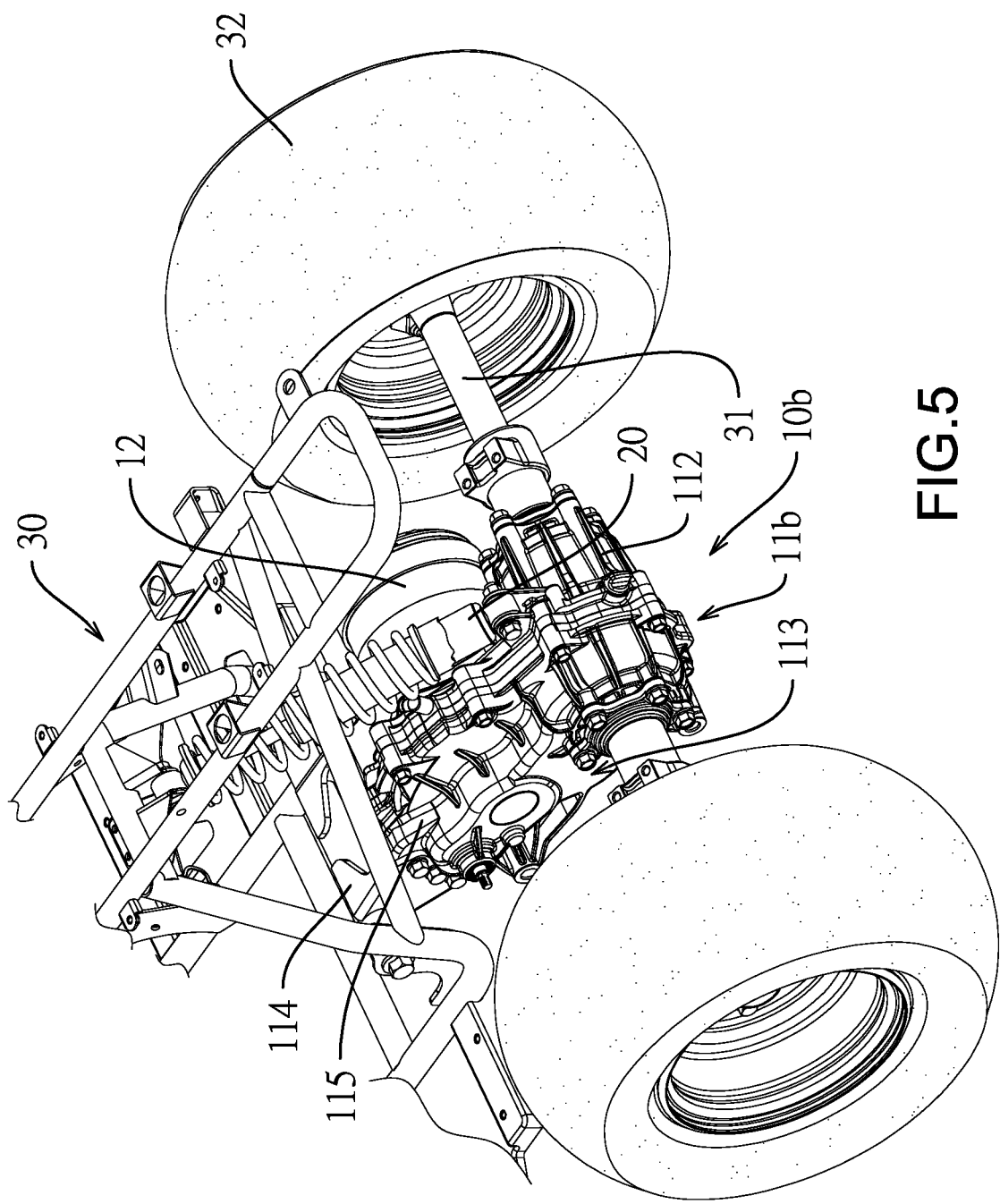
FIG. 5 is a perspective view of a second embodiment of the vehicle drivetrain device in accordance with the present invention.
Figure 6:
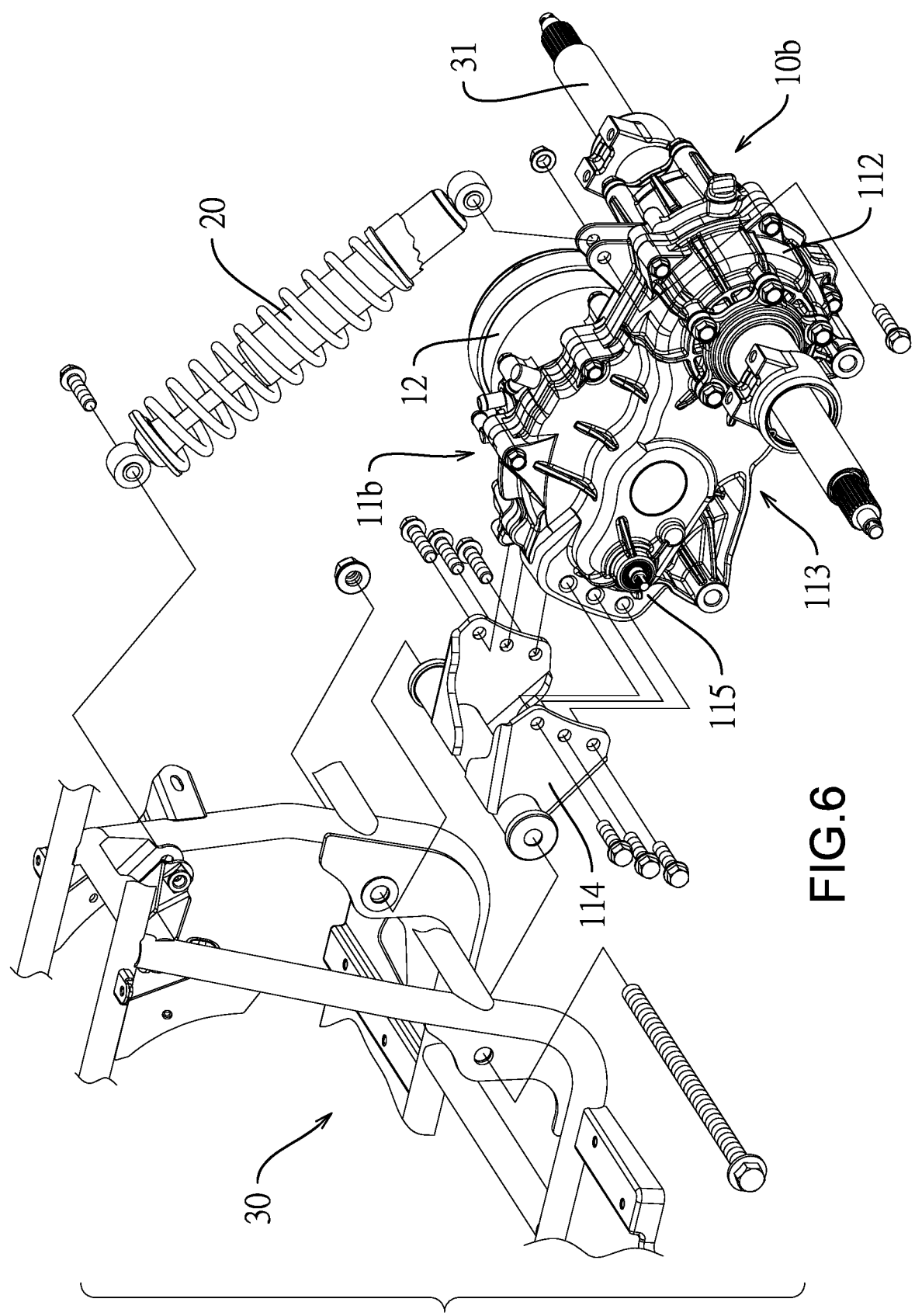
FIG. 6 is an exploded perspective view of the second embodiment of the vehicle drivetrain device in accordance with the present invention.
Figure 7:
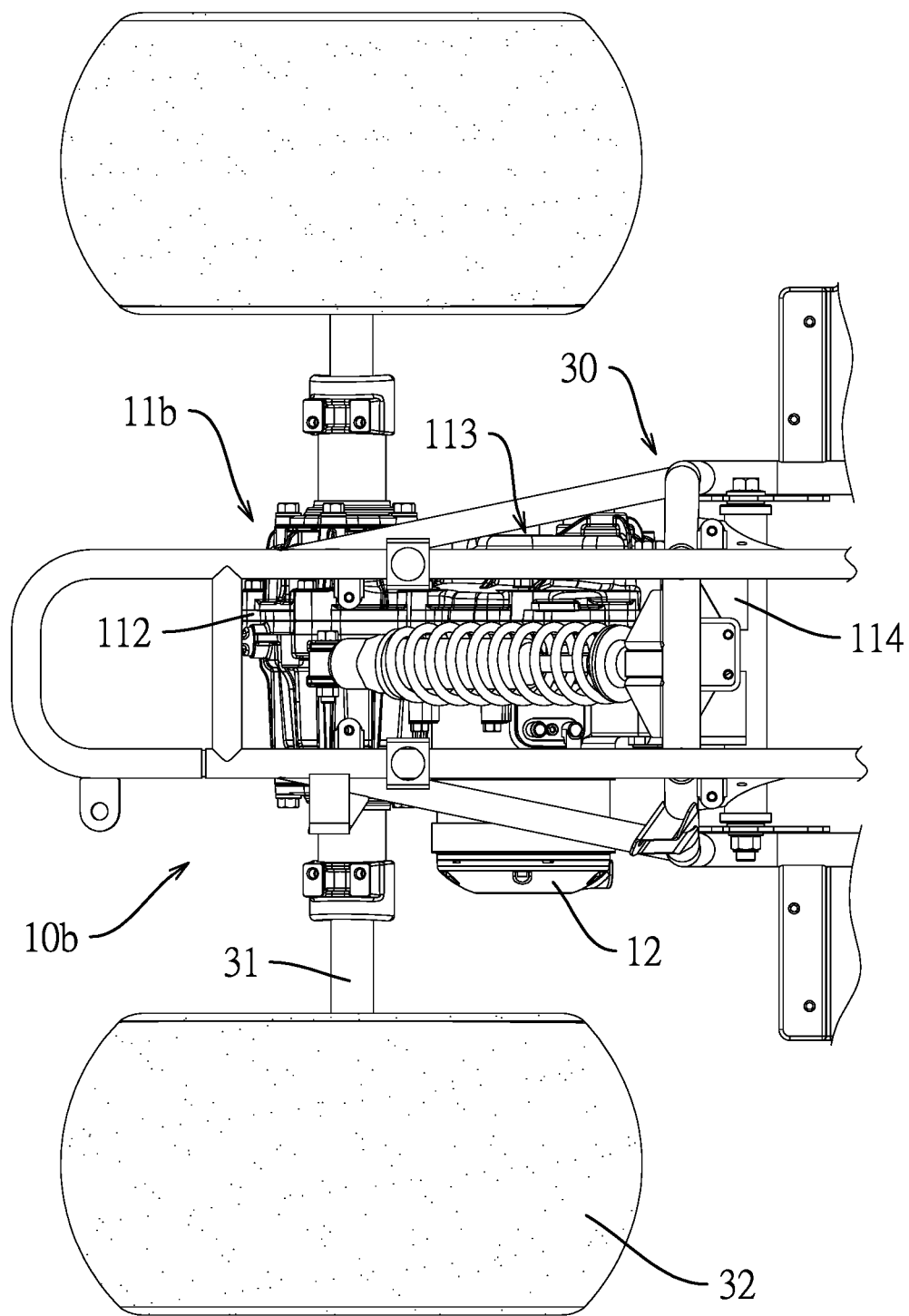
FIG. 7 is an upper view of the second embodiment of the vehicle drivetrain device in accordance with the present invention.
Figure 8:
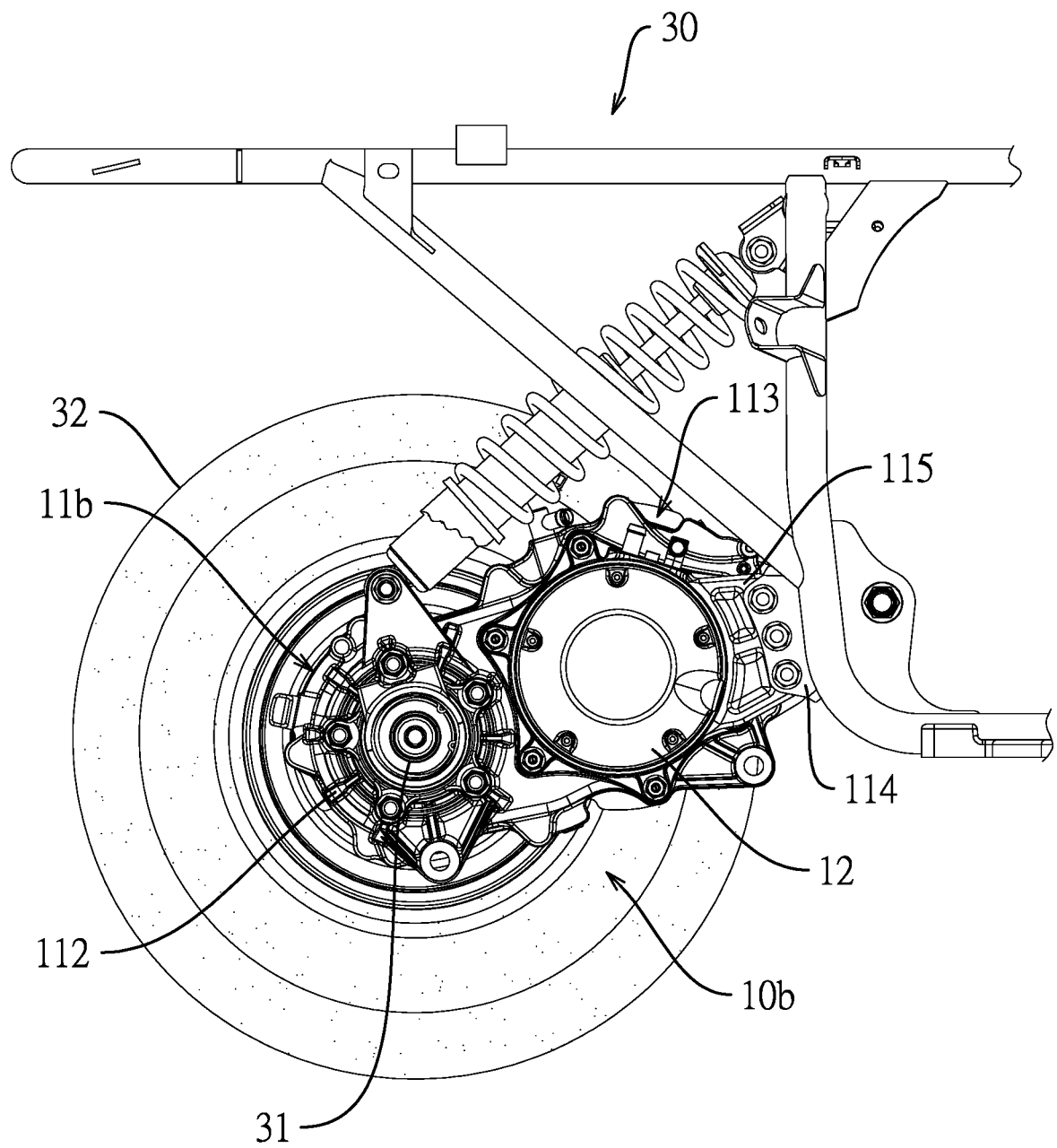
FIG. 8 is a side view of the second embodiment of the vehicle drivetrain device in accordance with the present invention.

With reference to FIGS. 1 and 5, preferable embodiments of a vehicle drivetrain device related to the present invention are shown. The vehicle drivetrain device is configured to be mounted between a vehicle frame 30 and a wheel axle 31 of a vehicle, and comprises a driving assembly 10a, 10b and a shock absorber 20.

As shown in FIGS. 1 to 8, the driving assembly 10a, 10b comprises a transmitting mechanism 11a, 11b and a driving mechanism 12. The transmitting mechanism 11a, 11b has a pivotal end, pivotally connected to the vehicle frame 30, and a connecting end, connected to the wheel axle 31. The pivotal end and the connecting end are two opposite ends of the transmitting mechanism 11a, 11b. The driving mechanism 12 is mounted at a side of the transmitting mechanism 11a, 11b, and is configured to output power to the transmitting mechanism 11a, 11b, which transfers the power outputted by the driving mechanism 12 to the wheel axle 31. Besides, the driving mechanism 12 is preferably an electric motor.

As shown in FIGS. 1 to 8, the shock absorber 20 is mounted between the vehicle frame 30 and the driving assembly 10a, 10b, and is configured to provide shock absorbing and buffering functions between the vehicle frame 30 and the driving assembly 10a, 10b.

The vehicle drivetrain device has different embodiments according to different connecting ways of the transmitting mechanism 11a, 11b pivotally connected to the vehicle frame 30. For example, as shown in FIGS. 1 to 4, in a first embodiment of the vehicle drivetrain device, the transmitting mechanism 11a of the driving assembly 10a has a pivotal portion 111 and a connecting portion 112. The pivotal portion 111 is disposed at the pivotal end and is pivotally connected to the vehicle frame 30. The connecting portion 112 is disposed at the connecting end and is connected to the wheel axle 31. As shown in FIGS. 5 to 8, in a second embodiment of the vehicle drivetrain device, the transmitting mechanism 11b of the driving assembly 10b comprises a transmitting mechanism body 113 and a converting plate 114. The transmitting mechanism body 113 has a connecting portion 112 and a linking portion 115 opposite each other. The connecting portion 112 is connected to the wheel axle 31. The converting plate 114 is fixedly mounted on the linking portion 115 of the transmitting mechanism body 113, and is pivotally connected to the vehicle frame 30.

With reference to FIGS. 1 to 8, the driving mechanism 12 of the driving assembly 10a, 10b can output power and transfer power to the wheel axle 31 by the transmitting mechanism 11a, 11b, so the wheel axle 31 can drive vehicle wheels 32 of the vehicle to rotate. Additionally, because the driving assembly 10a, 10b is pivotally connected to the vehicle frame 30, and because the shock absorber 20 is connected to the vehicle frame 30 and the driving assembly 10a, 10b, when the vehicle shakes due to the uneven terrains, the driving assembly 10a, 10b is used as a rear rocker arm and cooperates with the shock absorber 20 to provide functions of shock absorbing and buffering to the vehicle.

To sum up, the driving assembly 10a, 10b of the vehicle drivetrain device is pivotally connected to the vehicle frame 30 and is connected to the wheel axle 31, and cooperates with the shock absorber 20 to provide the functions of shock absorbing and buffering, and thus the driving assembly 10a, 10b possesses functions of a conventional rear rocker arm and provides power. Therefore, a space between the vehicle frame 30 and the wheel axle 31 can be used efficiently, and the occupancy of a usable space below the vehicle frame 30 is decreased. Furthermore, the transmitting mechanism 11a, 11b can be directly connected to the wheel axle 31 by a gear set, simplifying a total structure, thereby lowering the cost.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the board general meaning of the terms in which the appended claims are expressed.

What is claimed is:

1. A vehicle drivetrain device configured to be mounted between a vehicle frame and a wheel axle of a vehicle, the vehicle drivetrain device comprising:
    a driving assembly comprising
        a transmitting mechanism having
            a pivotal end pivotally connected to the vehicle frame; and
            a connecting end directly connected to the wheel axle by a gear set;
        a driving mechanism mounted at a side of the transmitting mechanism, being moveable curvedly relative to the vehicle frame when the transmitting mechanism is pivoted relative to the vehicle frame, and configured to output power to the transmitting mechanism; the transmitting mechanism transferring the power outputted by the driving mechanism to the wheel axle; and
    a shock absorber mounted between the vehicle frame and the driving assembly, and configured to provide shock absorbing and buffering functions between the vehicle frame and the driving assembly.

2. The vehicle drivetrain device as claimed in claim 1, wherein the transmitting mechanism of the driving assembly has
    a pivotal portion pivotally connected to the vehicle frame; and
    a connecting portion connected to the wheel axle.

3. The vehicle drivetrain device as claimed in claim 1, wherein the transmitting mechanism of the driving assembly comprises
    a transmitting mechanism body having
        a connecting portion connected to the wheel axle;
        a linking portion; and
    a converting plate fixedly mounted on the linking portion of the transmitting mechanism body, and pivotally connected to the vehicle frame.

* * * * *